Figure 1:
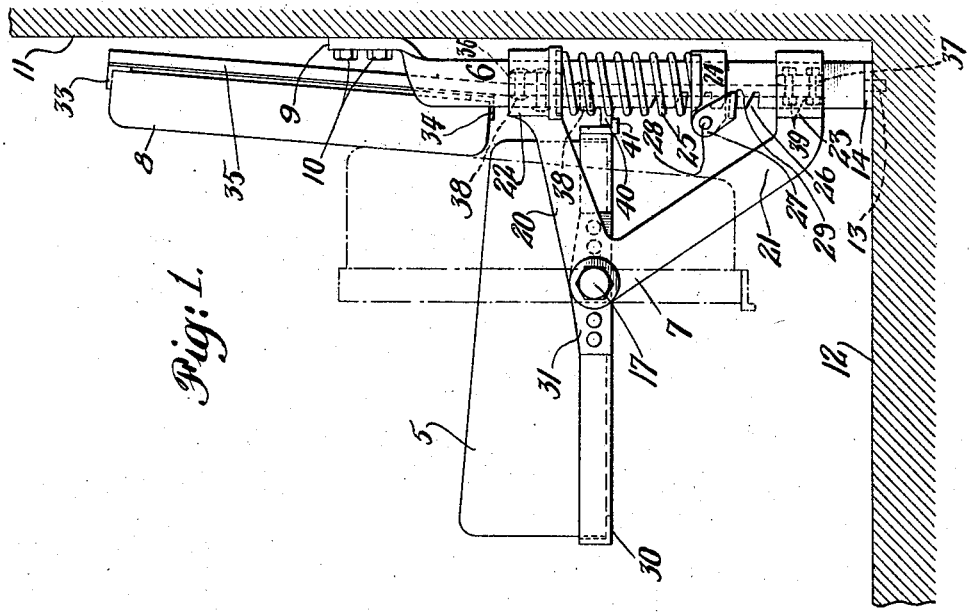
Figure 2:
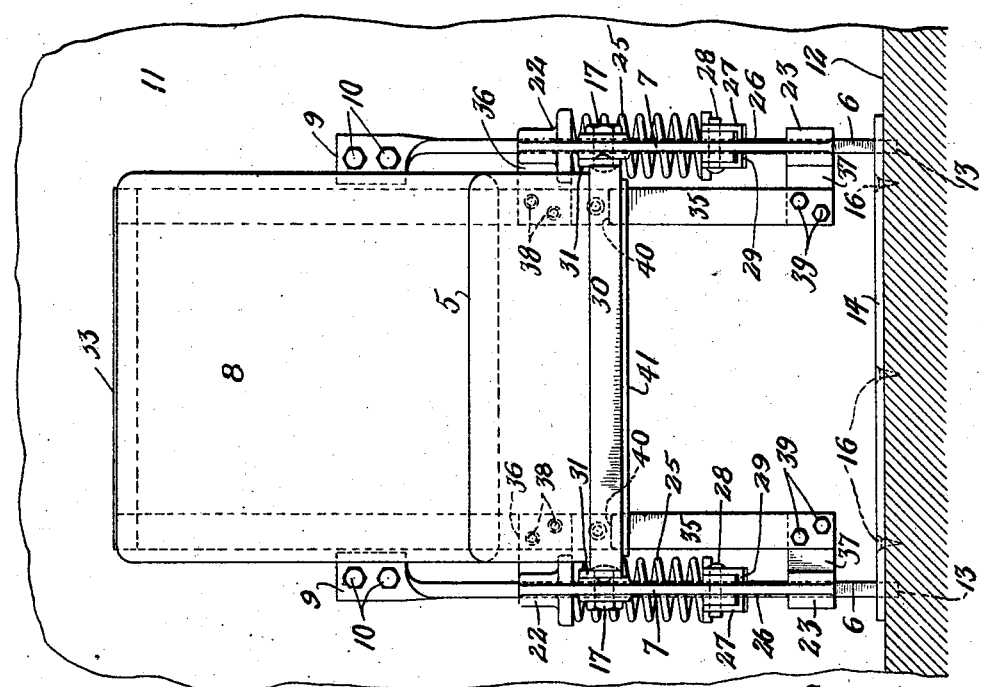

March 22, 1927.

H. W. SNYDER

SEAT

Filed Sept. 24, 1925

1,621,520

Inventor
Herbert W. Snyder
By his Attorneys

Patented Mar. 22, 1927.

1,621,520

UNITED STATES PATENT OFFICE.

HERBERT W. SNYDER, OF LIMA, OHIO.

SEAT.

Application filed September 24, 1925. Serial No. 58,219.

My invention relates to seats useful in locomotive cabs and the like. In preferred forms of embodiment, such as hereinafter described, the invention is peculiarly adapted to situations where (as in locomotive cabs) space is restricted, or a permanent, fixed seat would sometimes be in the way. The embodiment of the invention here shown and described is also comfortable and easy riding and conveniently adjustable in height.

In the drawings, Fig. I is a side elevation of a selected and preferred embodiment of my invention, illustrating its installation in a situation such as a locomotive cab, whose wall and floor are diagrammatically shown in section.

Fig. II is a similar view from the left of Fig. I.

As here shown, the seat 5 is supported by an upright member 6, which in the present instance serves as a guide for up and down movement of a bracket 7 on which the seat is mounted. A back 8 is shown adjacent the seat 5, preferably also mounted on the bracket 7. As shown in Fig. II, there are two of the guides 6, 6 and the brackets 7, 7, one of each at either side of the seat 5. These guides 6, 6 are shown as consisting of flat metal bars, with their upper ends twisted at right angles to afford feet 9, 9 for attachment (as by bolts or lag screws 10) to the cab wall 11. The lower ends of the members 6, 6 may be secured to the cab floor 12 in any suitable manner, as by engagement of reduced end projections 13 in corresponding holes in a flat bar 14 that may be fastened to the floor by screws 16. The seat 5 is preferably made shiftable, so that it may be swung from the horizontal position shown in full lines to a vertical position, such as indicated in dotted lines. For this purpose, it is shown pivoted between the brackets 7, 7 at 17, 17.

Adjustment in the height of the seat 5 may be provided for by sliding engagement of the brackets 7, 7 with the guides 6, 6, and also a cushion action to absorb shocks and give easy riding. As here shown, each of the brackets 7, 7 has upper and lower arms 20, 21 provided with collars 22, 23 that embrace the corresponding member 6 loosely enough to permit easy movement. In the present instance, each bracket 7 is supported at the desired height by a collar-like member 4 adjustable on the guide 6 between the bracket arms 20, 21, and the seat 5 is cushioned by a helical compression spring 25 mounted around the guide 6 between the collars 22, 24, which have appropriate flanges to engage their ends. As shown, the front edge of each guide 6 has a series of notches or teeth 26, and the corresponding collar 24 is provided with latch or dog 27 for engaging the notches, pivoted at 28 to a corresponding portion of the collar 24. The latch 27 is U-shaped, with ears or lugs at either side of the collar 24, and an intermediate portion 29 for engaging the notches. The overhang of the latch pivot 28 with reference to the notches 26 prevents accidental disengagement of the latch from a notch.

The seat 5 may be of any suitable or preferred construction, and may be removably mounted in an angle bar frame 30, here shown as carrying ears 31, 31 for the pivots 17, 17. The back 8, likewise of any suitable or preferred construction, may be removably mounted between horizontal angle bars 33, 34 secured to upright members 35, 35. As here shown, these members 35, 35 extend down below the back 8, and are secured to lateral ears 36, 37 on the bracket collars 22, 23 by rivets or bolts 38, 39. The horizontal or service position of the seat 5 may be determined and maintained by correlative engagement means thereon and on the back structure,—here shown as comprising bracket lugs 40, 40 secured to the members 35, 35 by the rivets 38, and the horizontal flange of an L bar 41 secured to the rear side of the seat frame 30.

From the foregoing description, it will be seen that the seat 5 can be instantly swung up out of the way against the back 8, substantially parallel therewith, or vice-versa; that it can be readily adjusted in height by engaging the latches 27, 27 in the proper notches 26 of the members 6, 6; and that for any desired position of adjustment, the up and down movement of the brackets 7, 7 and the seat 5 is cushioned by the springs 25, 25. It will also be seen that the back 8 automatically maintains its proper relation to the seat 5, moving with the brackets 7, 7 in all their spring cushion movements or adjustments.

What I claim is:

1. A device of the character described comprising upright guide means, a bracket with upper and lower arms slidably engaging said guide means, a seat carried by said bracket, and spring supporting means for said bracket adjustable along said guide means between said arms.

2. A device of the character described comprising upright guide means, a bracket with upper and lower arms slidably engaging said guide means, a seat pivoted to said bracket, a back structure secured to the upper and lower bracket arms carrying stop means for said seat, and spring supporting means for said bracket adjustable along said guide means between said arms.

3. A device of the character described comprising notched upright guide means, a seat bracket with upper and lower arms slidably engaging said guide means, a compression spring for supporting the upper bracket arm around said guide means, and a support for said spring adjustable along said guide means by engagement with its notches.

In testimony whereof, I have hereunto signed my name.

HERBERT W. SNYDER.